United States Patent [19]

Austin et al.

[11] 3,731,773

[45] May 8, 1973

[54] SLIP CLUTCH ASSEMBLY

[75] Inventors: Max M. Austin, Mishawaka; Norman B. Boulton, South Bend, both of Ind.

[73] Assignee: National-Standard Company, Wiles, Mich.

[22] Filed: Sept. 24, 1971

[21] Appl. No.: 183,541

[52] U.S. Cl. ............... 192/41 S, 192/56 C, 192/81 C
[51] Int. Cl. ............................................. F16d 41/20
[58] Field of Search .................... 192/41 S, 56 C, 80, 192/81 C

[56] References Cited

UNITED STATES PATENTS

| 3,117,660 | 1/1964 | Dodwell | 192/80 X |
| 1,629,098 | 5/1927 | Drexler | 192/41 S |
| 3,266,131 | 8/1966 | Mallory et al. | 192/41 S X |
| 3,412,833 | 11/1968 | Lang | 192/41 S X |
| 3,557,920 | 1/1971 | Lang | 192/41 S |

Primary Examiner—Allan D. Herrmann
Attorney—Johnson, Dienner, Emrich, Verbeck & Wagner

[57] ABSTRACT

A band clutch assembly of the overrunning type designed to slip at a predetermined torque. A clutch band has a preformed spring section which cooperates with the underlying or overlying arcuate portion of an adjacent band section to provide a controlled compounding of the tip end of the band, which ceases at a predetermined applied torque to permit the band to slip.

14 Claims, 15 Drawing Figures

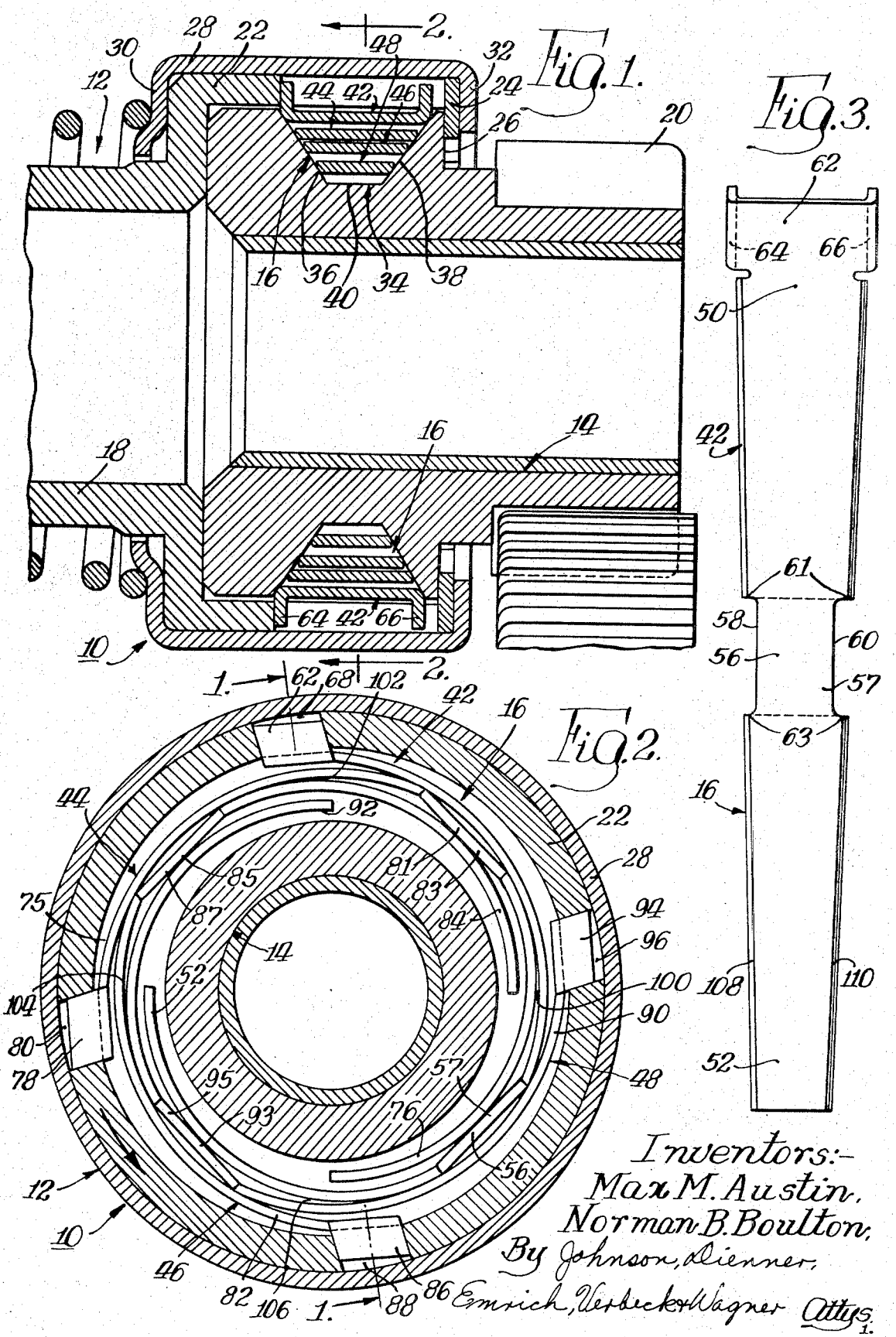

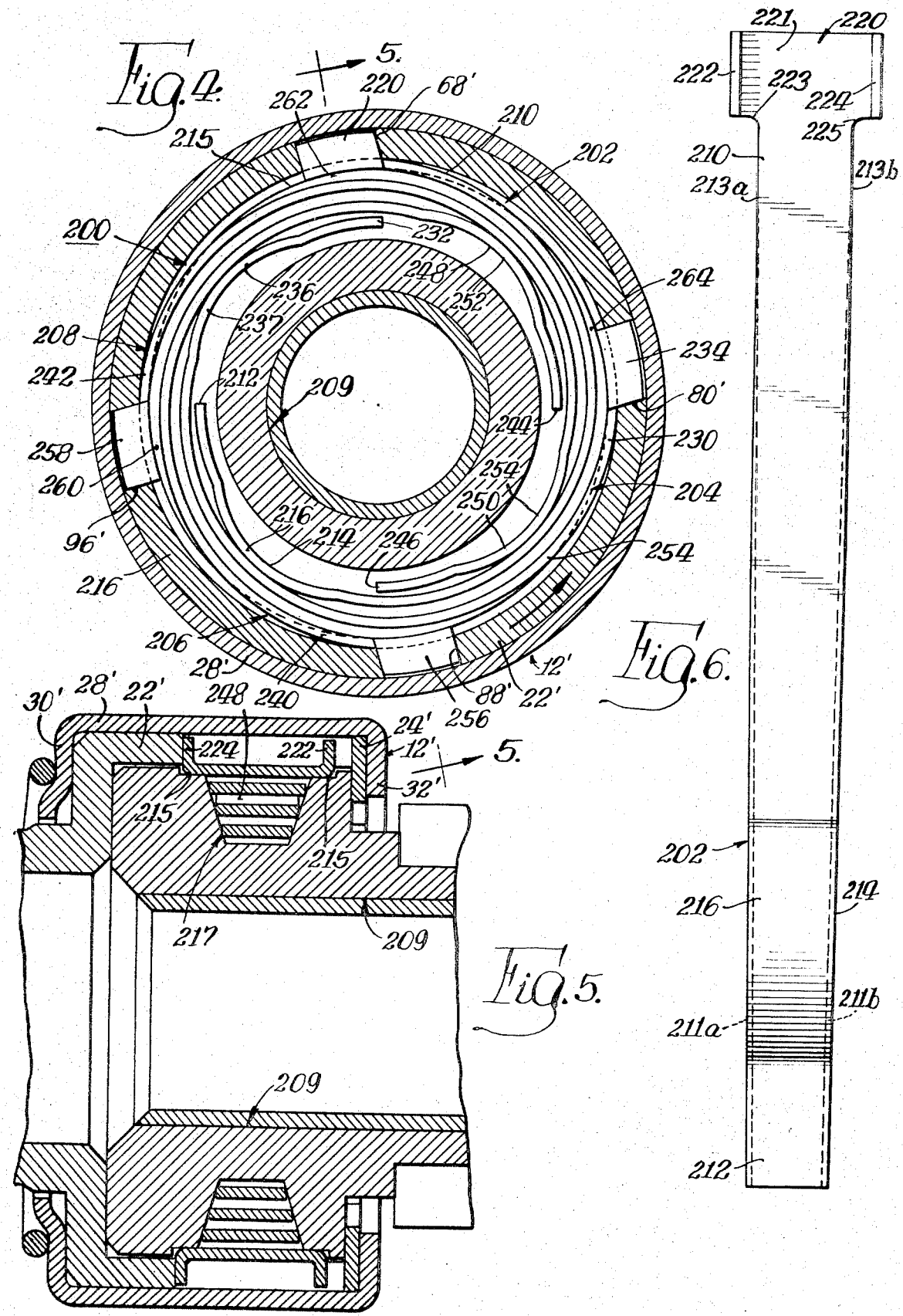

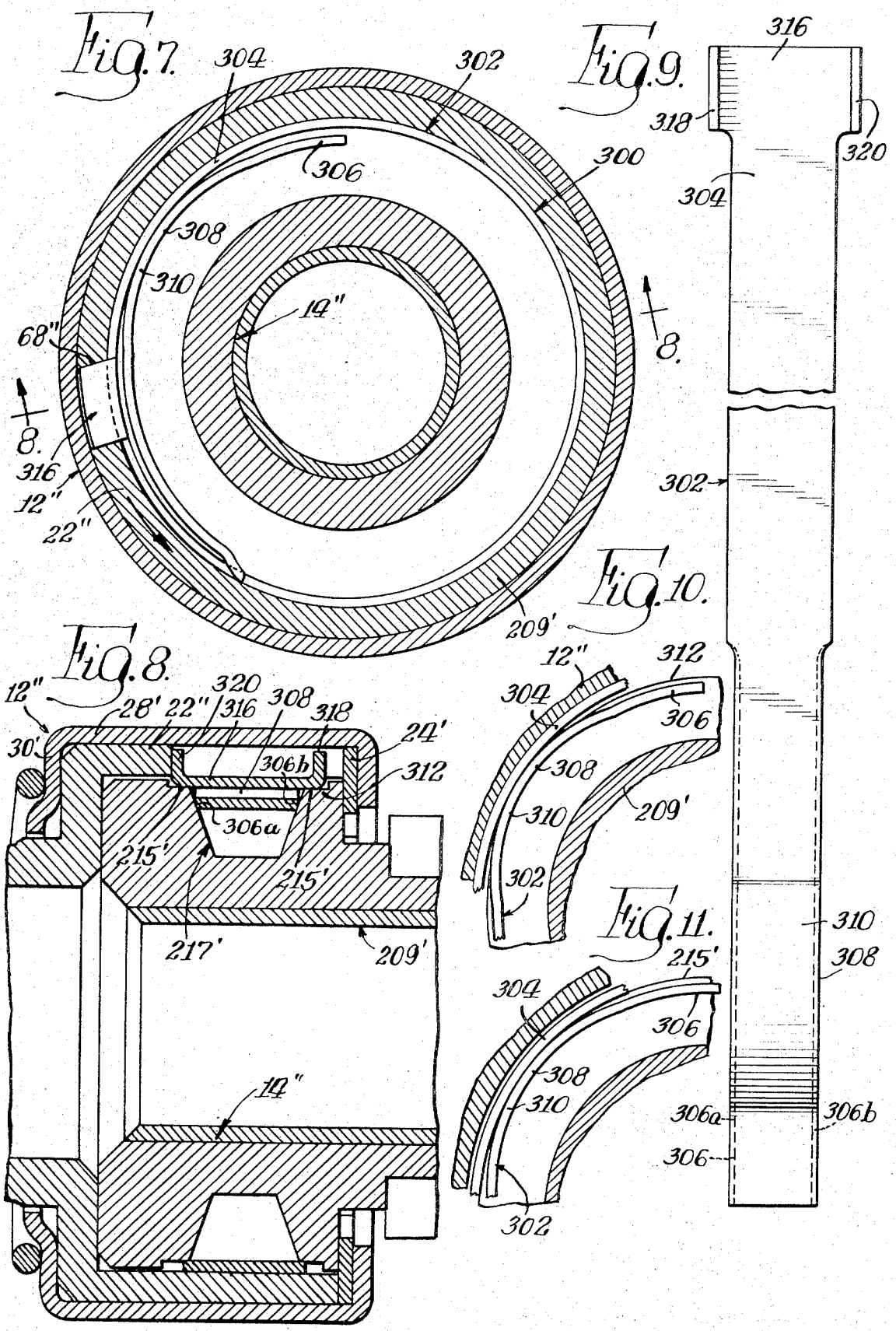

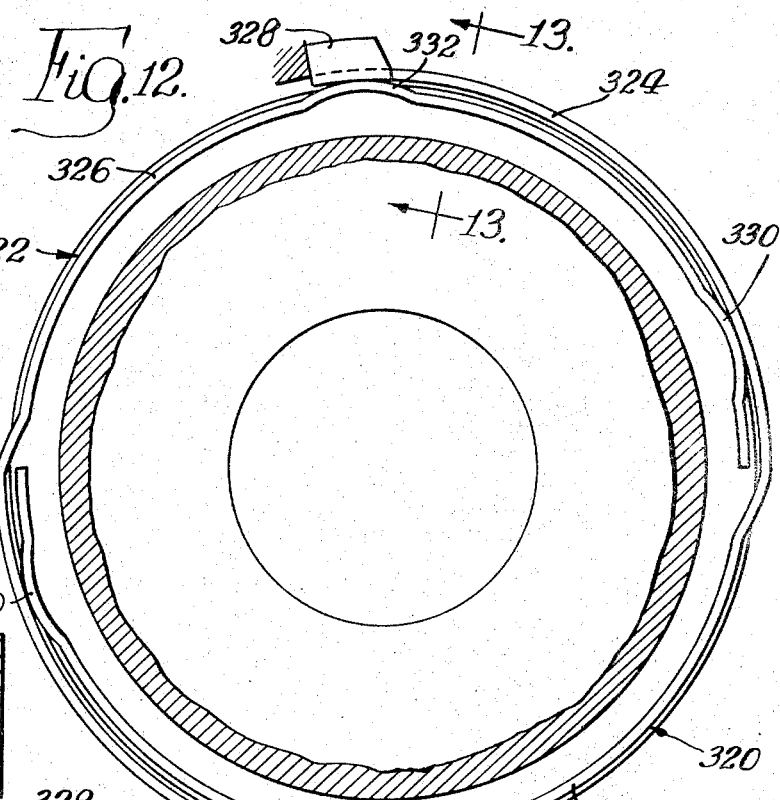
Fig. 12.
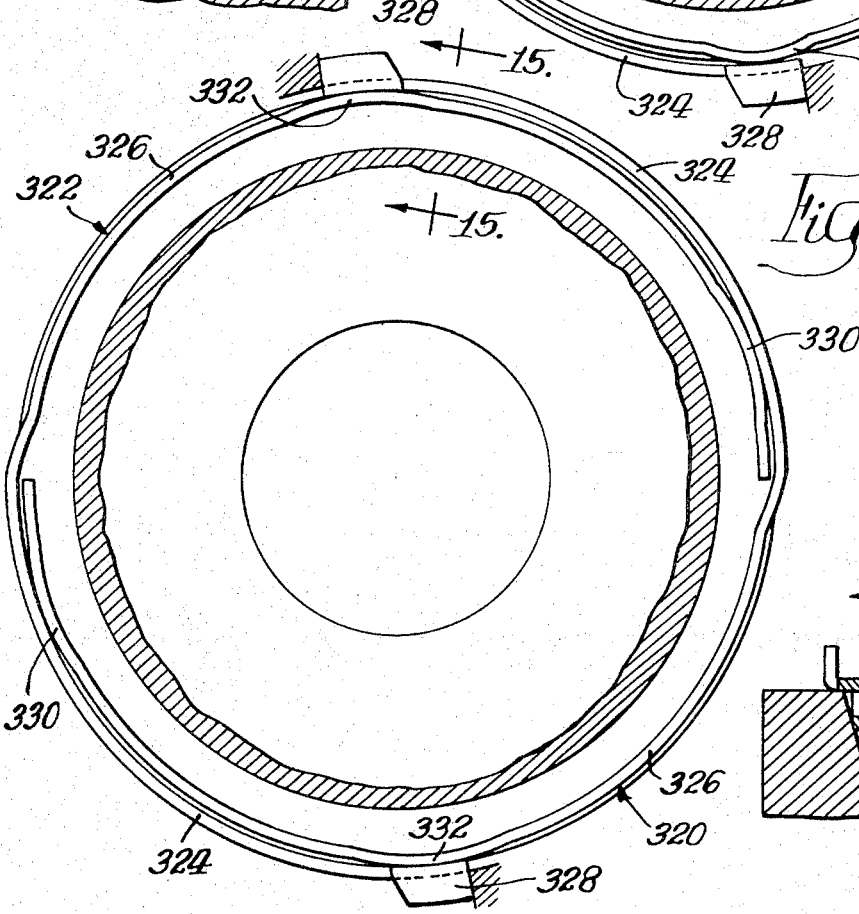
Fig. 13.
Fig. 14.
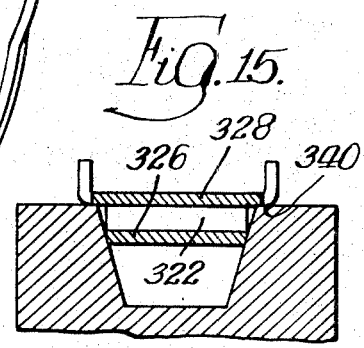
Fig. 15.

SLIP CLUTCH ASSEMBLY

BACKGROUND OF THE INVENTION

The present invention relates to a clutch band for band clutches of the overrunning type.

The clutch band of this invention relates to the class of band clutch constructions disclosed in U.S. Pat. No. 2,518,453, issued Aug. 15, 1950 to J. M. Dodwell. This patent discloses a band-type free-wheeling clutch embodying drive and driven clutch members, one of which is provided with a V-groove into which the narrow tapered ends of a plurality of interfitting and overlapping clutch bands are disposed. The wide ends of such clutch bands are anchored to the other of such clutch members so that upon rotation of the drive member in one direction a driven member is driven in the same direction through the engagement of the side edges of the narrow tapered ends of each clutch band with the side walls of the V-groove.

In operation of the overrunning or free-wheeling type clutches, upon rotation of the drive clutch member so as to tighten the clutch bands around the V-groove, the overlying portions of the clutch bands are drawn tightly against the underlying portions of adjacent clutch bands and the side edges of the clutch bands are urged into frictional driving engagement with the side walls of the V-groove. A steady increase in the torque applied to the drive clutch member causes the clutch bands to contract into a tighter relationship until one or more of the clutch bands breaks at its anchor end, which is anchored to the drive clutch member.

It is an object of this invention to provide a band clutch construction of the overrunning type which will slip at a predetermined applied torque.

It is a further object of this invention to provide a band clutch construction of the overrunning type, wherein a band has a preformed spring section which cooperates with the underlying and overlying segments of adjacent band section to provide a controlled compounding of the tip end of the band until a predetermined applied torque is reached and thereafter to cause the clutch band to slip.

These and other objects, features, and advantages of the present invention will become apparent from the following description with the aid of the attached drawing of a preferred embodiment of the invention.

SUMMARY OF THE INVENTION

A new and improved clutch band assembly for use in overrunning clutches having a drive clutch member and a driven clutch member, where one of the members is provided with a circumferentially extending V-groove. A band is formed as an elongated structure having a wider end portion anchored to one clutch member and a narrower end portion extending into the V-groove of the other clutch member such that the overlapping and interfitting segments of adjacent band sections are spaced apart within the V-groove during the engagement and disengagement of the side edges of the clutch bands with the side edges of the V-groove.

The band has a preformed spring section intermediate its ends. When a torque is applied to the drive member in the clutch engaging direction, the initial radial inward contraction of the band brings the spring sections into contact with the adjacent band section and the interacting forces resulting from this interengagement produces a compounding action on the narrower end portion of the band in direct response to an increase in applied torque. This compounding action ceases when one of the interengaging portions seats and arrests further increases in their interacting forces. Consequently, the clutch band will slip with any further additional torque applied to the drive member.

To anchor each clutch band to the drive clutch member, the band is formed with an integral anchor which has a U-shaped cross-section formed by upturning the sides of the wider end portion of the band.

DESCRIPTION OF THE DRAWINGS

For a better understanding of the present invention, reference may be had to the accompanying drawing in which:

FIG. 1 is a vertical sectional view of an overrunning type clutch showing one embodiment of a clutch band assembly constructed in accordance with the principles of the present invention;

FIG. 2 is a sectional view taken along the line 2—2 of FIG. 1 and looking in the direction of the arrows;

FIG. 3 is a top plan view of one embodiment of one of the clutch bands depicted in FIG. 1;

FIG. 4 is a sectional view of an overrunning type clutch illustrating another embodiment of clutch band assembly constructed in accordance with the principles of this invention;

FIG. 5 is a sectional view taken along the line 5—5 of FIG. 4;

FIG. 6 is a top plan view of one of the clutch bands depicted in FIG. 4;

FIG. 7 is a sectional view of an overrunning type clutch illustrating a third embodiment of a clutch band assembly constructed in accordance with the principles of this invention;

FIG. 8 is a sectional view taken along the line 8—8 of FIG. 7 and looking in the direction of the arrows;

FIG. 9 is a top plan view of the clutch band depicted in FIG. 7;

FIGS. 10 and 11 are partial views of FIG. 7 depicting, respectively, the relative position of the interengaging portions of the clutch band during the overrun and driving conditions, respectively;

FIG. 12 illustrates a sectional view of a modified version of the third embodiment, showing the clutch band assembly in the overrun condition;

FIG. 13 is a sectional view taken along the line 13—13 of FIG. 12 and looking in the direction of the arrows;

FIG. 14 depicts the clutch band assembly of FIG. 12 in the drive condition; and

FIG. 15 is a sectional view taken along the line 15—15 of FIG. 14 and looking in the direction of the arrows.

FIRST EMBODIMENT

In FIGS. 1 and 2, there is shown an overrunning band clutch 10 having drive and driven clutch members 12 and 14, respectively, and a plurality of overlapping torque transmitting clutch bands, generally designated by the reference numeral 16. The drive clutch member 12 has a drive shaft (partially shown) 18 adapted to be driven by a suitable prime mover (not shown) and the driven clutch member 14 is illustrated as having a pinion 20 to interconnect the clutch 10 to any desired driven member. The inner end of the driven clutch member 14 is disposed coaxially with an annular flange 22 of the drive clutch member 12. A thrust washer 24 engages the outer end of the annular flange 22 and the end wall 26 of the driven clutch member 14 and is retained in position by a collar 28 which encloses the clutch 10 between the radially inwardly extending flanges 30 and 32.

As is conventional in clutches of this type, the driven clutch member 14 is formed with a circumferentially extending V-groove 34 defined by opposed sidewalls 36 and 38 tapering inwardly towards each other and by a bottom wall 40. The driven clutch member 14 is generally made of hardened steel or a similar material to withstand the wedging action of the clutch bands 16.

In the embodiment illustrated in FIGS. 1 and 2, the clutch band assembly 16 comprises four identical clutch bands 42, 44, 46 and 48 of generally spiral configuration which are positioned to be disposed in an interfitting and overlapping arrangement. Each of the clutches are integrally formed as a one-piece structure preferably made of spring steel stock.

The clutch band 42 is illustrated by way of example in FIG. 3. The clutch band 42 has a wider end portion 50 and a narrower end portion or tip 52. A spring section 56 in the form of a flattened or reversely curved segment 57 is provided intermediate the two ends when the clutch band 42 is shaped to the desired curvature, heat treated and finally heat set. The spring section 56 has its side edges 58 and 60 recessed or relieved to prevent any engagement with the side walls of the V-groove 34 to define a pair of shoulders 61 and 63.

Integrally formed with the wider end portion 50 of clutch band 42 is an anchor 62 having a U-shaped cross-section formed by two upturned flanges 64 and 66. Due to the simple manner in which anchor 62 can be formed, it provides a substantial improvement over all previously known anchors for clutch bands, for it can be made very inexpensively when compared with these previous anchors. The anchor 62 is formed at the juncture of the wider end portion 50 by turning up the flanges 64 and 66 (FIG. 1). The resulting anchor is not only inexpensive to manufacture but also very sturdy. Because the anchor 62 is integrally formed with the clutch band 42, the juncture between the end portion 50 and anchor 62 is very strong and will resist bending or breaking when repeated large torques are applied to the clutch band 42. The anchor 62 is fitted into a suitably disposed conformably formed anchor pocket 68 in the annular flange 22 of the drive clutch member 12.

The clutch band 44 similarly has a wider end portion 75 and a narrower end portion or tip 76 and is tapered therebetween. The clutch band 44 has an integral projecting anchor 78 at its wider end portion fitted into a suitably disposed conformably formed anchor pocket 80 in the annular flange 22 of the drive clutch member 12 and also a spring section 81 in the form of a flattened segment 83 intermediate its end portions. The clutch member 46 has a wider end portion 82 and a narrower end portion or tip 84 is a tapered therebetween with an intermediate spring section 85 in the form of a flattened segment 87. The anchor 86 of clutch band 46 is fitted into a suitably disposed conformably formed anchor pocket 88 in the annular flange 22 of the drive clutch member 12. Likewise, the clutch band 48 has a wider end portion 90 and a narrower end portion or tip 92 and is tapered therebetween with an intermediate spring section 93 in the form of a flattened segment 95. A clutch band 48 is coupled to the annular flange 22 by an integral projecting anchor 94 at the wider end portion 90 fitted into a suitably disposed conformably formed anchor socket 96 in the annular flange 22 of the drive clutch member 12.

One of the important and critical features to the design of a slip clutch of the present invention is that the overlapping and underlapping segments of clutch bands 42–48, other than the contact points of the spring sections, are spaced apart from each other within the V-groove 34 during the engagement and disengagement of the side edges of each clutch band with the side walls of the V-groove. In this embodiment, the non-contact arrangement is provided by tapering the narrow end or tip to an angle of taper slightly greater than the theoretical angle for the taper of the side walls of the v-groove 34 around which the clutch bands 42–48 are to be wound, i.e., to an angle of taper slightly greater than the angle whereby the clutch bands 42–48 would tightly overlap one against the other when the clutch bands were tightened together. As a result, the clutch bands 42–48 spiral more deeply into the V-groove than normal, and open interstices are formed between adjacent clutch bands. One interstice 100 is formed between the clutch bands 44 and 42, another interstice 102 between the clutch bands 46 and 44, another interstice 104 between the clutch bands 48 and 46 and another interstice 106 between the clutch bands 42 and 48.

In operation of the embodiment of FIGS. 1–2, when the drive member 12 begins to rotate in the direction indicated by the arrow in FIG. 2, clutch bands 42–48 are tightened around the V-groove 34, and as the bands contract in a radial inward direction, the center of each flat segment 57, 83, 87 and 95 moves into contact with the radially outward surface of the underlying band, as depicted in FIG. 2. As more torque is applied, these flat segments tend to conform to the shape of the supporting band, with the result that the force exerted on the underlying band increases to provide a compounding action, which continues until the shoulders 61, 63 (FIG. 3) of the flat segments engage the V-groove 34. This engagement of the shoulders 61, 63 arrest any further compounding, and consequently, any additional applied torque will cause the clutch to slip.

SECOND EMBODIMENT

In the embodiment illustrated in FIG. 4, the clutch band assembly 200 comprises four identical clutch bands 202, 204, 206 and 208 of general spiral configuration which are positioned to be disposed in an interfitting and overlapping arrangement in the circumferentially extending V-groove 217 of driven clutch member 209.

The drive clutch member shown in FIG. 5 is identical to the drive clutch member 12 of the first embodiment and like parts are indicated by prime numbers. The driven clutch member 209 has the same construction as the driven clutch member 14 except a pair of annular shoulders 215 are provided on opposite sides of the outer edge of V-groove 217.

Each of the clutch bands 202, 204, 206 and 208 are identical in construction and preferably made of spring steel stock. Clutch band 202 is depicted by way of example in FIG. 6 and comprises a wider end portion 210 and a narrower end portion or tip 212. Intermediate its ends, clutch band 202 is provided with a spring section 214 in the form of a bulge 216 when the clutch band 202 is shaped to the desired curvature, heat treated and finally heat set.

Integrally formed with the wider end portion 210 of clutch band 202 is an anchor 220 having a U-shaped cross-section formed by two upturned flanges 222 and 224. The anchor 220 is fitted into anchor pocket 68' formed in the annular flange 22' of the drive clutch member 12'. Anchor 220 performs the same function and has the same advantages as anchor 62 of the First Embodiment, but is formed slightly differently. The coined side edges 211a and 211b extending longitudinally from the narrower end portion 212 gradually fade out at wider end portion 210 and the side edges 213a and 213 at the wider end portion are parallel trimmed surfaces. The anchor 220 comprises a U-shaped member having a bight portion 221 substantially wider than the widest dimension of the wider end portion 210 and two upturned flanges 222 and 224. The bight portion is integrally connected to the wider end portion 210 having two inwardly curved blending surfaces 223 and 225.

The clutch band 204 similarly has a wider end portion 230 and a narrower end portion or tip 232 and is tapered therebetween. An integral anchor 234 extending from wider end portion 230 is seated in anchor pocket 80' in the annular flange 22' of drive clutch member 12'. A spring section 236 in the form of a bulge 237 is formed intermediate its end portions in a like manner to clutch band 202.

Likewise, clutch bands 206 and 208 have, respectively, wider end portions 240 and 242, narrower end portions or tips 244, 246, and intermediate spring sections 248, 250 comprising bulges 252, 254; clutch bands 206 and 208 are, respectively, coupled to the annular flange 22' by integral projecting anchors 256 and 258 extending, respectively, from wider ends 240, 242 and are fitted into sockets 88' and 96' of flange 22'.

As previously mentioned in describing the first embodiment, it is essential that the clutch bands 202-208, other than the spring sections, are spaced apart from each other within the V-groove (as depicted in FIG. 6) during the engagement and disengagement of the side edges of each clutch band with the side walls of the V-groove. With such an arrangement, open interstices are formed between adjacent clutch bands. One interstice 260 is formed between clutch bands 202 and 204, another interstice 262 between clutch bands 204 and 206, and another interstice 264 between clutch bands 206 and 208. These interstices are provided by virtue of the wider end portion and narrower end portion of each band lying in spaced relationship, except for the bulges. To give a large bearing surface for the anchors during the compression of the bands, the pair of shoulders 215 is formed in driven clutch member 209. By virtue of this arrangement the anchors do not dig into the upper sides of the V-groove 217, as is the case with the first embodiment.

In operation of the embodiment shown in FIG. 4, when the drive member 12 begins to rotate in the direction indicated by the arrow in FIG. 4, the clutch bands 202-208 are compressed, and the intermediate portions of the bands contract in a radial inward direction causing the furthest radially outward portion of the bulge on each band to contact the radial inward surface of the overlying band. As more torque is applied, the engaging surface of the overlying band pushes radially inwardly against the bulge to provide a compounding action. When the overlying band seats in the V-groove, the compounding action ceases and any additional applied torque will cause the clutch to slip.

THIRD EMBODIMENT

In the third embodiment, the drive clutch member and driven clutch member are substantially identical to those shown in the second embodiment, and like parts to the second embodiment are indicated by prime numbers and to the first embodiment by double prime numbers. As illustrated in FIG. 7, the clutch band assembly 300 comprises a single clutch band 302 of general spiral configuration which is positioned such that its outer end portions are in an interfitting and overlapping arrangement.

Clutch band 302, as depicted in FIG. 9, comprises a wider end portion 304, a narrower end portion 306, and a spring section 308 in the form of a bulge 310 provided intermediate its ends. The clutch band 302 is preferably made of spring steel stock that is shaped to the desired curvature shown in FIG. 7, heat treated and finally set.

The width of the wider end portion 304 is greater than the distance between the pair of shoulders 215' of V-groove 217' in order that the wider end portion 304 is contained within the annular ring area 312 (FIG. 8) defined by the pair of shoulders 215'. As depicted in FIG. 6, the narrower end portion 306 is smaller in width than the distance between the pair of shoulders 214' as seen in FIG. 8, and is adapted to seat in V-groove 217'. To permit the narrower end portion 306 to properly seat between the sidewalls of the V-groove 217', its longitudinal edges 306a and 306b are beveled in a radial inward direction.

Integrally formed with the wider end portion 304 of the clutch band 302 is an anchor 316 having a U-shaped cross-section formed by two upturned flanges 318 and 320 in the same manner as the previously described second embodiment. The anchor 316 is fitted into anchor pocket 68" formed in the annular flange 22" of the drive clutch member 12". As clearly depicted in FIG. 7, the length of the clutch band 302 is sufficiently long to allow the narrower end portion 306 to be in underlapping interfitting relation with the wider end portion 304. As previously mentioned in describing the first two embodiments, it is essential that the overlapping surfaces within the V-groove of adjacent bands be spaced apart from each other during the engagement and disengagement of the side edges of the clutch band with the sidewalls of the V-groove. In this embodiment, this relationship is provided by shaping each band such that the narrow end portion and the wider end portion are on concentric circular planes, except for their humps.

In the operation of the embodiment shown in FIG. 7, when the drive member 12" begins to rotate in the direction indicated by the arrow in FIG. 7, the band sections are compressed and the intermediate part of the band contracts in a radial inward direction, causing the radial inward surface of the overlying segment of the overlying band section to contact the furthest radially outward portion of the bulge 310, as depicted in FIG. 10. As more torque is applied the engaging surface of the overlying band segment pushes radially inward against the bulge 310 to produce a compounding action on the narrow end portion 306 and drives the narrow end portion into engagement with V-groove 217′. When the overlying segment of the wider end portion 304 engages the pair of annular shoulders 215′, as depicted in FIG. 11, the compounding action ceases to increase and any additional applied torque will cause the clutch to slip.

The concept of shaping the clutch bands so that their outer and inner band portions lie in concentric planes could be successfully used in non-slipping clutch band assemblies as well. One such use could use a spacer member of the type shown in U.S. Pat. No. 3,557,920, which issued to E. U. Lang and E. E. Mallory on Dec. 12, 1968, in place of the spring section 308. Since the spacer member is relatively rigid, the compounding action would continue with increases in applied torque to the drive member and consequently there would be no slipping between the clutch bands and the driven member. Another possibility is to form the clutch band so that the inner and outer portions lie in concentric planes with the distance separating the planes being less than the thickness of the clutch band.

It will be appreciated from the foregoing description of the three embodiments that the third embodiment could be made to comprise a clutch band assembly having more than one clutch band. Likewise, the first two embodiments which show four clutch bands could be made to have either more or less clutch bands and would work as well with only one clutch band having the two end portions in an overlapping relation as illustrated in the third embodiment.

A modified version of the above-described third embodiment is depicted in FIGS. 12 – 15. The modification resides in adding a second spring section to each band.

In FIGS. 12 – 15, two clutch bands 320 and 322 are shown in interfitting relation. The clutch bands are formed in the same manner as the clutch band depicted in FIG. 9, except that a second spring section has been added. The clutch bands comprise a wider end portion 324, a narrower end portion 326 and a U-shaped anchor 328. As before, the two end portions are arranged in concentric planes. Two spring sections 330 and 332 in the form of bulges are spaced apart along the narrower end portion.

The second spring section provides an additional contact point with the overlying portion of the adjacent clutch band. The advantages of providing an additional contact point are that it helps o prevent rebound of the clutch bands during compression and that it greatly reduces the repeated stresses applied to spring section to thereby add to its fatigue life.

Referring to FIGS. 12 – 15, FIGS. 12 and 13 show the clutch bands 320 and 322 in the overrun or at the very start of the driving condition, where the only engagement between the clutch bands within the V-groove is made at the two spring sections. As the torque applied to the driving clutch member increases, the engaging surface of the overlying band pushes inwardly against the pair of bulges to produce a compounding action on the narrow end portion. When the overlying segment of the wider end portion engages the outer surface area 340 on either side of the V-groove, as depicted in FIGS. 13 and 15, the compounding action ceases to increase. Any further applied torque will cause the clutch bands to slip.

It will be further apparent that modifications and variations may be made in the band configuration of each of the three embodiments without departing from the scope of the novel concepts of the present invention. It is accordingly our intention that the scope of the invention be limited solely by that of the hereinafter appended claims.

We claim as our invention:

1. In combination in an overrunning clutch having a drive member and a driven member coaxially disposed with respect to the drive clutch member, a clutch engaging means for transmitting a torque between said drive and driven said clutch members when said drive clutch member is rotated in one direction, said clutch engaging means including slip means to limit and maintain the torque transmitted between said clutch member upon said clutch drive member reaching a predetermined torque, one of said clutch members being provided with a circumferentially extending V-groove and wherein said clutch engaging means comprises a torque transmitting band having one end portion anchored to the other of said clutch members and the other end portion extending into the V-groove of said one clutch member, said band being formed such that said end portions have overlapping segments, and wherein said slip means comprises a preformed spring section formed in one of said overlapping segments which is biased to push against the other of said segments, whereby upon torque being applied to said drive member said band contracts in a radial inward direction causing said overlapping segments to interengage and deflect said spring section with a resulting compounding action on said other end portion, which compounding ceases when the deflection of said spring action is arrested, whereby said clutch band will thereafter slip under the application of additional torque.

2. In combination in an overrunning clutch as defined in claim 1, wherein said spring section comprises at least one preformed bulge.

3. In combination in an overrunning clutch as defined in claim 1, wherein said spring section comprises at least one preformed flattened segment which is relieved along its two side edges to prevent any engagement with said sidewalls of said V-groove.

4. In combination in an overrunning clutch as defined in claim 1, wherein said spring section comprises at least one preformed reversed curvature segment which is relieved along its two side edges to prevent any engagement with said side walls of said V-groove.

5. In combination in an overrunning clutch having a drive clutch member and a driven clutch member coaxially disposed with respect to the drive clutch member, one of said clutch members being provided with a circumferentially extending V-groove, and at least one torque transmitting band disposed between said clutch members and formed with the outer and inner end portions disposed in concentric circular planes with overlapping segments, said at least one torque transmitting band having said outer end portion anchored to the other of said clutch members and said inner end portion disposed in the V-groove of said one clutch member and including means for causing said segments to interengage with a resulting compounding action on the inner end portion upon torque being applied to said drive member.

6. In combination in an overrunning clutch as defined in claim 5, wherein said means for causing said segments to interengage comprises at least one preformed bulge provided in one of said segments and extending towards the other of said segments.

7. In combination in an overrunning clutch as defined in claim 5, wherein said means for causing said segments to interengage comprises a block member provided on one of said segments and extending towards the other of said segments.

8. In combination in an overrunning clutch as defined in claim 5, wherein said means for causing said segments to interengage comprises the spacing between said inner and outer segments being less than the thickness of said clutch band.

9. In combination in an overrunning clutch as defined in claim 5, wherein said outer end portion of each of said bands has parallel longitudinal edges which are wider than the distance between the outer edge of said V-groove and said inner end portion of each of said bands has parallel longitudinal edges which are narrower than said distance so that said inner end portion can engage with the side walls of said V-groove, said concentric circular planes in spaced apart relationship, and said interengagement means comprising at least one spring section which limits the resulting compounding action to a predetermined level.

10. In combination in an overrunning clutch having a drive clutch member and a driven clutch member coaxially disposed with respect to the drive clutch member, one of said clutch members being provided with a circumferentially extending V-groove, and a plurality of overlapping torque transmitting bands in spaced apart relationship, each of said bands having one end portion anchored to the other of said clutch members and the other end portion extending into the V-groove of said one clutch member, and each of said bands including a spring means for engagement and cooperation with an adjacent band causing said spring means to deflect and produce a compounding action on said other end portion of each band in response to a torque being applied to said drive member in the clutch engaging direction, which compounding action ceases when the deflection of said spring means is arrested whereby said clutch bands will thereafter slip under the application of additional torque.

11. In combination in an overrunning clutch as defined in claim 10, wherein said spring means comprises at least one preformed flattened segment intermediate said end portions which is relieved along its two side edges to prevent any engagement with said side walls of said V-groove.

12. In combination in an overrunning clutch as defined in claim 10, wherein said spring means comprises at least one preformed reversed curvature segment intermediate said end portions which is relieved along its two side edges to prevent any engagement with said side walls of said V-groove.

13. In combination in an overrunning clutch as defined in claim 10, wherein said spring means comprises at least one preformed bulge intermediate said end portions.

14. In combination in an overrunning clutch having a drive clutch member and a driven clutch member coaxially disposed with respect to the drive clutch member, a clutch engaging means for transmitting a torque between said drive and driven clutch members when said drive clutch member is rotated in one direction and comprising at least one clutch band formed as a one piece structure including an anchor having a bight portion extending lengthwise and two upturned flange portions extending from opposite side edges of said bight portion to define a U-shaped configuration.

* * * * *